United States Patent
Song et al.

(10) Patent No.: US 9,830,839 B2
(45) Date of Patent: Nov. 28, 2017

(54) DISPLAY APPARATUS

(71) Applicant: LG ELECTRONICS INC., Seoul (KR)

(72) Inventors: Hyeoncheol Song, Seoul (KR); Ahreum Lee, Seoul (KR); Kyueung Lee, Seoul (KR); Jinsu Kim, Seoul (KR); Inwan Choi, Seoul (KR)

(73) Assignee: LG ELECTRONICS, INC., Seoul (KR)

( * ) Notice: Subject to any disclaimer, the term of this patent is extended or adjusted under 35 U.S.C. 154(b) by 252 days.

(21) Appl. No.: 14/183,888

(22) Filed: Feb. 19, 2014

(65) Prior Publication Data

US 2014/0376163 A1    Dec. 25, 2014

(30) Foreign Application Priority Data

Jun. 20, 2013    (KR) ................. 10-2013-0071081

(51) Int. Cl.
| | |
|---|---|
| *H05K 7/00* | (2006.01) |
| *H05K 5/00* | (2006.01) |
| *G09F 9/30* | (2006.01) |
| *G06F 1/16* | (2006.01) |
| *H04N 5/64* | (2006.01) |

(52) U.S. Cl.
CPC ............ *G09F 9/301* (2013.01); *G06F 1/1601* (2013.01); *H04N 5/64* (2013.01)

(58) Field of Classification Search
CPC ....................................................... G01N 19/04
USPC ................................................... 361/679.01
See application file for complete search history.

(56) References Cited

U.S. PATENT DOCUMENTS

| | | | | |
|---|---|---|---|---|
| 4,958,521 A | * | 9/1990 | Morimoto | .............. G01N 19/04 73/150 A |
| 2008/0018631 A1 | * | 1/2008 | Hioki | ................ G02F 1/133305 345/206 |
| 2011/0249425 A1 | * | 10/2011 | Aurongzeb | ............. F21V 14/02 362/102 |
| 2013/0155655 A1 | * | 6/2013 | Lee | ......................... H05K 5/03 362/97.1 |

FOREIGN PATENT DOCUMENTS

| | | |
|---|---|---|
| EP | 2592614 A1 | 5/2013 |
| JP | 2006-023676 A | 1/2006 |
| JP | 2006023676 A * | 1/2006 |

* cited by examiner

*Primary Examiner* — Jerry Wu
(74) *Attorney, Agent, or Firm* — Dentons US LLP

(57) ABSTRACT

A display apparatus includes a display panel, a variable member to vary a shape of the display panel, the variable member including at least a first part and a second part that are discontiguous, and a drive unit to provide energy required to vary a separation distance between the first part and the second part.

18 Claims, 12 Drawing Sheets

(a)

(b)

US 9,830,839 B2

DISPLAY APPARATUS

CROSS-REFERENCE TO RELATED APPLICATION

This application claims the priority benefit of Korean Patent Application No. 10-2013-0071081 filed on Jun. 20, 2013, in the Korean Intellectual Property Office, the disclosure of which is incorporated herein by reference in its entirety.

BACKGROUND

1. Field of the Disclosure

The present disclosure relates to a display apparatus, and more particularly to a display apparatus having an improved configuration.

2. Description of the Related Art

Various types of display apparatuses to display an image are used. For instance, there are a variety of displays, such as a liquid crystal display panel, a plasma display panel, an organic light emitting display panel, and the like.

As usage of display apparatuses has gradually been extended to various fields, various characteristics are required in the respective fields, and demands in consideration of basic characteristics associated with image display as well as three-dimensional effects, immersiveness, and the like are increasing. To satisfy these various requirements, research to achieve various improved configurations of display apparatuses has been ongoing.

SUMMARY

One object is to provide a display apparatus that may achieve enhancement in various characteristics including immersiveness, and the like.

In accordance with one aspect, the above and other objects can be accomplished by the provision of a display apparatus including a display panel, a variable member to vary a shape of the display panel, the variable member including at least a first part and a second part that are discontiguous, and a drive unit to provide energy required to vary a distance between the first part and the second part.

In accordance with another aspect, there is provided a display apparatus including a display panel, a variable member to vary a shape of the display panel, and a drive unit to provide the variable member with energy required to vary the shape of the display panel. The drive unit includes a rotation drive member to supply rotation energy, a lead screw member to be rotated in linkage to the rotation drive member, and a moving member to move on the lead screw member, the moving member being connected or linked to the variable member.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Figure 1:
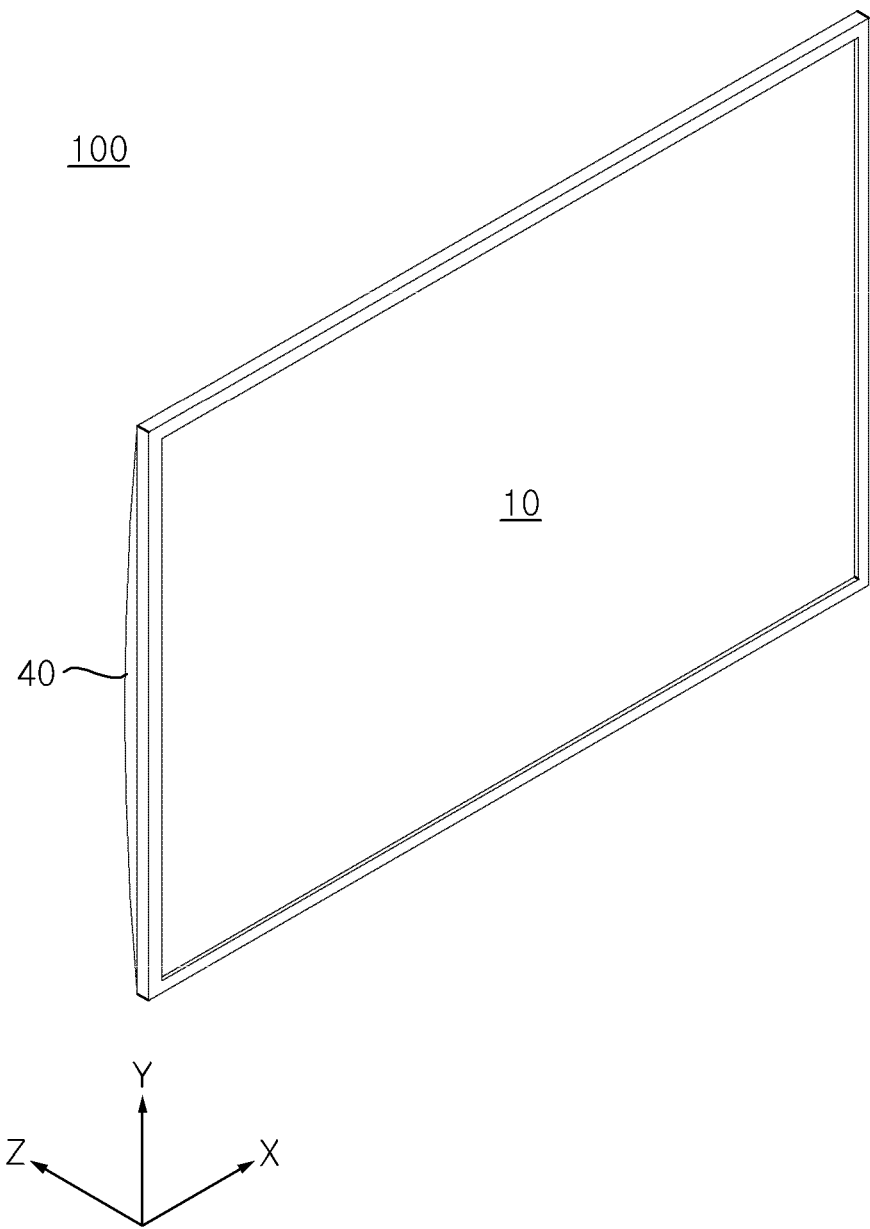
FIG. 1 is a front perspective view showing a display apparatus according to an embodiment of the present invention.

Reference will now be made in detail to the preferred embodiments of the present invention, examples of which are illustrated in the accompanying drawings. The present invention may, however, be embodied in many alternate forms and should not be construed as limited to the embodiments set forth herein.

For simplicity and clarity of description, illustration of components not associated with the description is omitted in the drawings, and the same or extremely similar elements are denoted by the same reference numerals throughout the specification. In addition, the thickness, area, and the like of elements in the drawings may be expanded or contracted to aid in clear understanding of the elements, and the thickness, area, and the like of the present invention are not limited to the illustration of the drawings.

It will be further understood that the term "include" is used to specify that any one component includes the other component, this does not preclude the presence or addition of one or more other components unless otherwise stated. In addition, when an element, such as a layer, film, region, plate, and the like, is referred to as being formed "on" another element, it can be "directly on" the other element or be indirectly formed with intervening elements therebetween. On the other hand, when an element, such as a layer, film, region, plate, and the like, is referred to as being formed "directly on" another element, this means that no element is interposed therebetween.

Hereinafter, a display apparatus according to an embodiment of the present invention will be described in detail with reference to the accompanying drawings.

Figure 2:
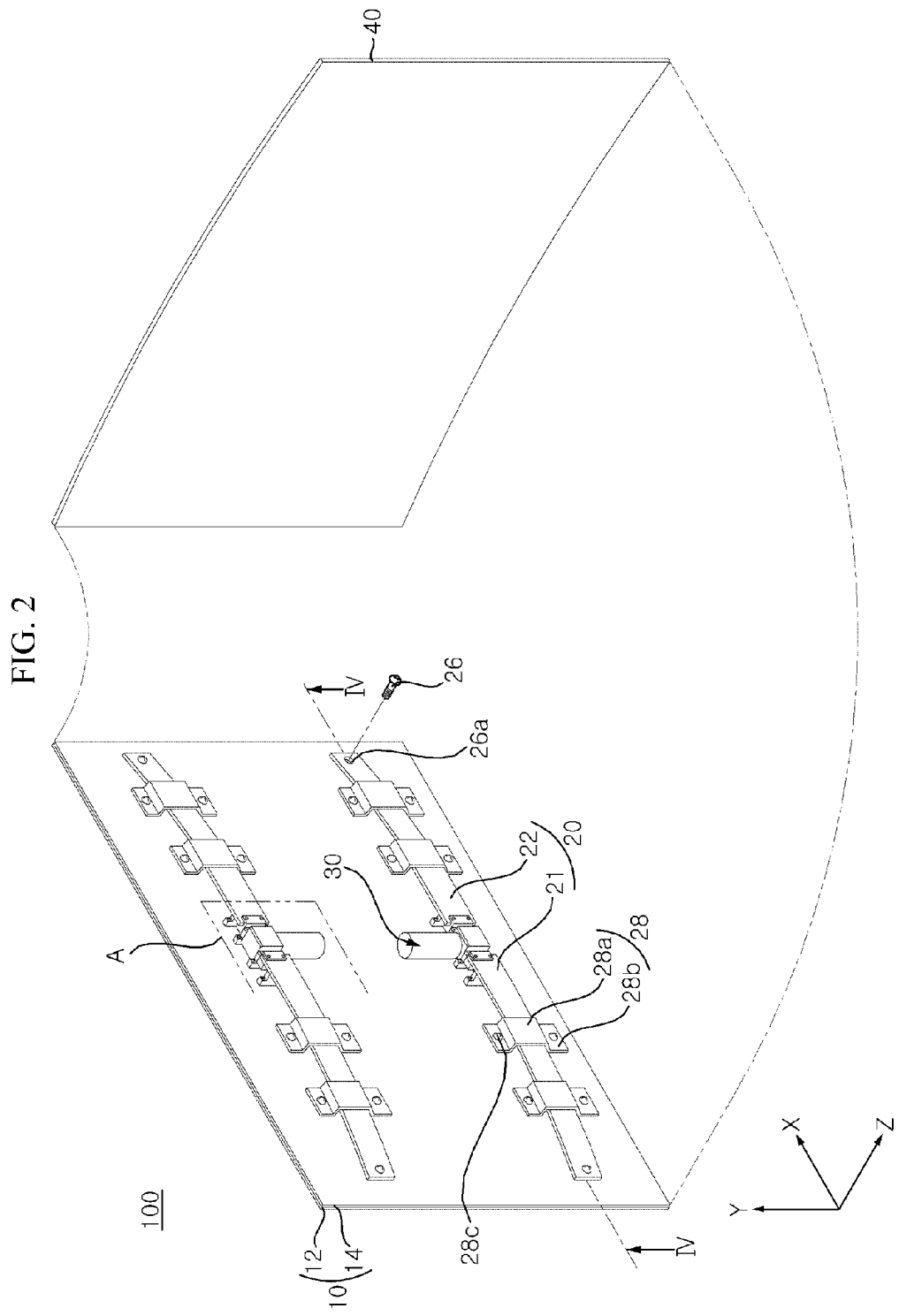
FIG. 2 is a rear exploded perspective view of the display apparatus shown in FIG. 1.
Figure 3:
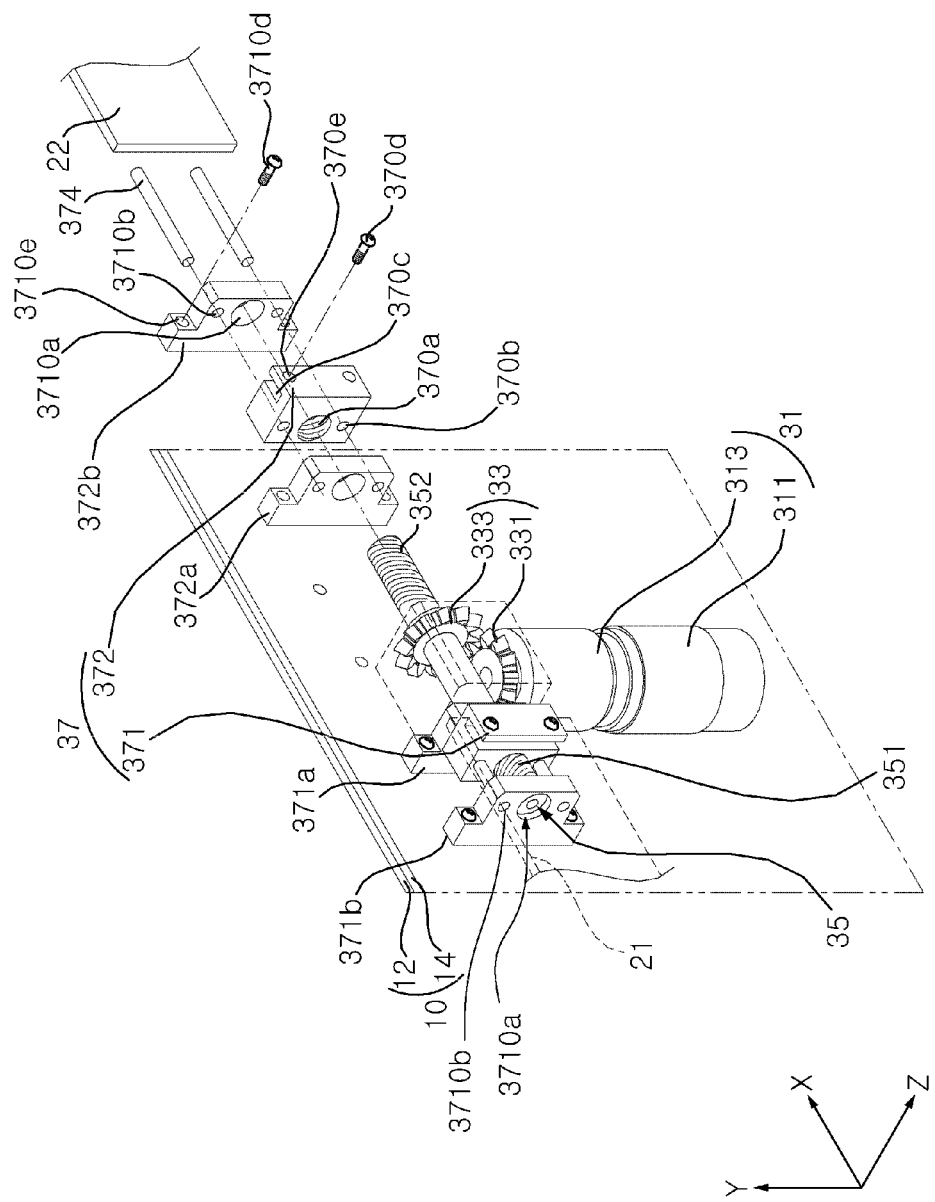
FIG. 3 is an enlarged-scale exploded perspective view of portion A of FIG. 2.

FIG. 1 is a front perspective view showing a display apparatus according to an embodiment of the present invention, FIG. 2 is a rear exploded perspective view of the display apparatus shown in FIG. 1, and FIG. 3 is an enlarged-scale exploded perspective view of portion A of FIG. 2.

Referring to the drawings, the display apparatus, designated by reference numeral 100, according to the present embodiment includes a display module 10 having a display panel 12 to display an image, a variable member 20 to enable variation in the shape of the display panel 12, and a drive unit 30 to provide the variable member 20 with energy required to vary the shape of the display panel 12. The display apparatus 100 further includes a rear cover 40 configured to cover a rear surface of the display module 10. This will be described later in greater detail.

The display apparatus 100 is used in a generic sense to refer to an apparatus that takes the form of a screen to display data, images, and the like. The display apparatus 100 may be any one of various kinds of display apparatuses, such as a television, computer monitor, mobile phone, e-book, and the like.

The display module 10 may include the display panel 12 to display an image in practice, a support member 14 located at a rear surface of the display panel 12 to support the display panel 12, and a panel drive unit (not shown) secured to the support member 14 to provide signals required to drive the display panel 12.

In the present embodiment, the display panel 12 to display an image may be fabricated in various configurations and via various methods. The display panel 12 is a flexible panel, the shape of which is variable by the variable member 20.

For instance, the display panel 12 may be an organic light emitting display panel using Organic Light Emitting Diodes (OLEDs). The organic light emitting display panel is a self-emissive display panel in which light is generated using electron-hole bonding in a fluorescent or phosphate organic thin film as current flows through the organic thin film. Organic light emitting display panels have several advantages, including provision of bright and vivid images, no limitations due to a viewing angle, low power consumption, and the like. In particular, the organic light emitting display panel may be fabricated via organic thin film lamination, thus exhibiting excellent flexibility. However, the present disclosure is not limited thereto and various kinds of the display panel 12 having various configurations and designs may be employed.

The support member 14 is located at the rear surface of the display panel 12 to support the display panel 12. A panel drive unit may be secured to a rear surface of the support member 14 to drive the display panel 12. In addition, the variable member 20 may be located at the rear surface of the support member 14. Accordingly, the support member 14 may be configured to exhibit not only a sufficient strength to firmly support and secure the display panel 12, the panel drive unit, and the variable member 20, but also be flexible and elastic to be variable in shape when the shape of the display panel 12 is varied. In addition, to prevent thermal stress, and the like, the support member 14 may have a thermal expansion coefficient analogous to that of the display panel 12.

For instance, in the present embodiment, the support member 14 may be formed of a composite material, such as a reinforced resin, and the like. Here, a composite material refers to a material in which two or more kinds of materials are artificially bonded to each other to achieve enhanced characteristics. Exemplary composite materials include reinforced resins, such as Carbon Fiber Reinforced Plastics (CFRPs), Glass Fiber Reinforced Plastics (GFRPs), and the like. Hence, the support member 14 may be lightweight and flexible, which are inherent features of plastics, and may achieve high strength and elasticity as well as excellent wear-resistance owing to various fibrous reinforcements.

The support member 14 may take the form of a single composite material layer, or may be a stack of multiple composite material layers for the purpose of high strength.

The support member 14 may be secured to the rear surface of the display panel 12 using an adhesive (e.g., a double-sided tape), and the like. However, the present disclosure is not limited thereto and various other methods may be adopted to couple the display panel 12 and the support member 14 to each other.

The panel drive unit, secured to the rear surface of the support member 14, includes a circuit board (not shown) provided with different wirings, devices, and the like, which provide signals required to drive the display panel 12. The circuit board may be secured to the support member 14 using a bracket (not shown), and the like. For instance, the bracket may be coupled, at a central portion thereof, to the support member 14, which may minimize force required to vary the shape of the display panel 12. However, the present disclosure is not limited thereto and various alterations, in which the panel drive unit is partially or wholly located at the outside of the display module 10, for example, are possible. In addition, the panel drive unit of the present embodiment may include the drive unit 30 to drive the variable member 20.

Although not additionally shown in the drawings, a framework configured to surround edges of the display panel 12 and the support member 14 may be further provided. The framework may serve not only to protect and enhance the strength of an edge of the display module 10, but also to assist the rear cover 40 in being stably seated on the display module 10. The shape of the framework, a coupling configuration of the framework and the rear cover 40, and the like may be accomplished through various configurations and methods.

The display module 10 (more particularly, the support member 14) is provided at the rear surface thereof with the variable member 20 to vary the shape of the display panel 12. In the present embodiment, the variable member 20 may comprise of a first part 21 and a second part 22, and may generally be elongated in a left-and-right direction of the display module 10. Although the drawings and the description illustrate the variable member 20 as including the first and second parts 21 and 22, the present disclosure is not limited thereto. For example, the variable member 20 may comprise of three or more parts. In this case, the following description of the first and second parts 21 and 22 may be applied to two neighboring parts among the three or more parts.

Each of the first and second parts 21 and 22 may take the form of an elongated band having a constant width. This form may assist the first and second parts 21 and 22 in more efficiently applying force to the display module 10. However, the present disclosure is not limited thereto and the first and second parts 21 and 22 may have various other shapes.

The first and second parts 21 and 22 may be formed of a material that is variable in shape to vary the shape of the display panel 12 to thereby apply force to the display module 10. Accordingly, the first and second parts 21 and 22 may include a single layer or multiple layers formed of a composite material, such as reinforced resins (CFRP, GFRP, and the like). However, the present disclosure is not limited thereto and the first and second parts 21 and 22 may be formed of various other materials.

Figure 4:
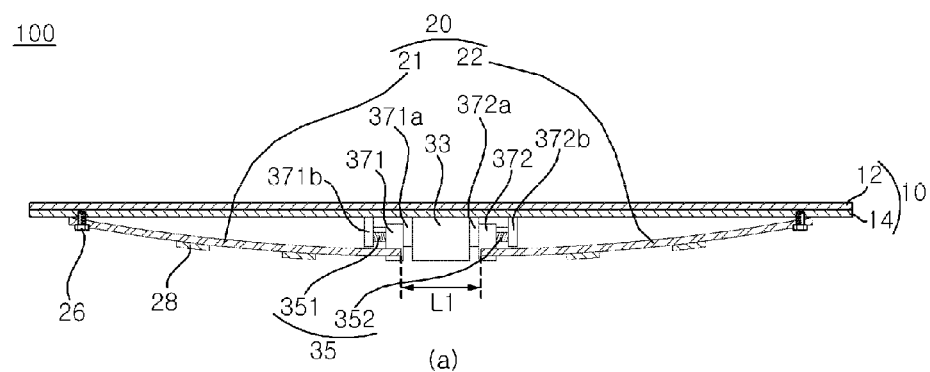
FIGS. 4(a)-4(b) are sectional views taken along line IV-IV of FIG. 2, for explanation of variation in the shape of the display apparatus shown in FIGS. 1 to 3.
Figure 4:
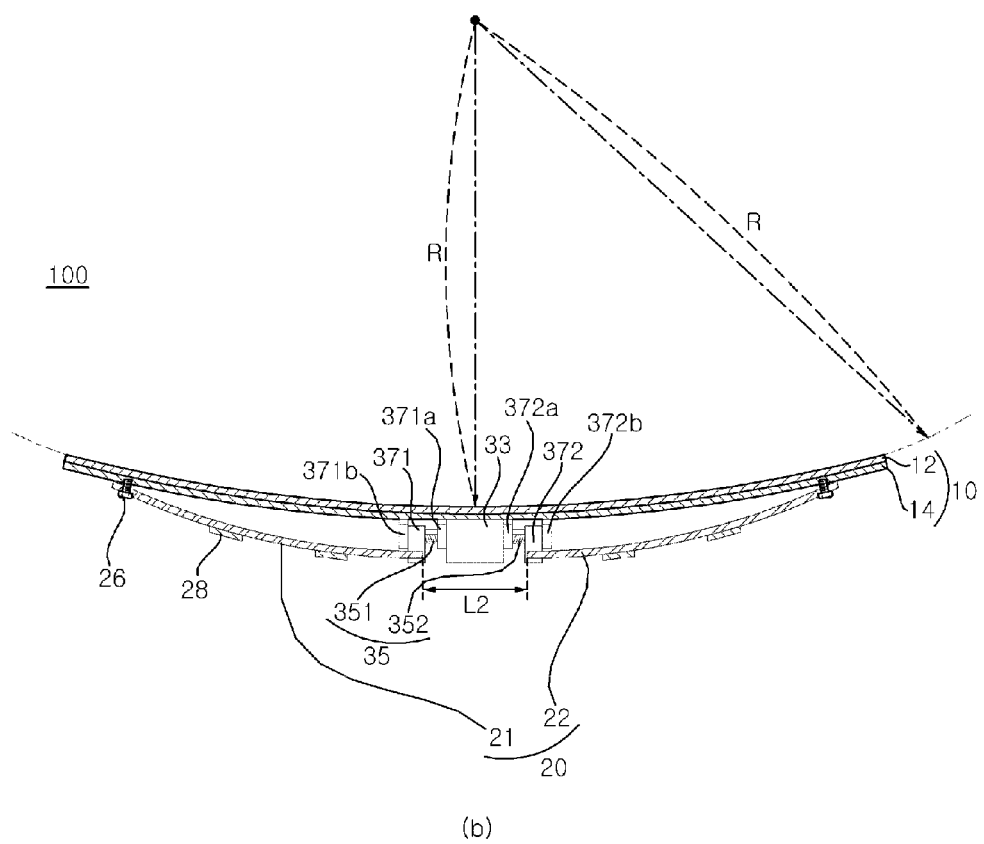

A distance between the variable member 20 and the display module 10 may be greater at the center of the display module 10 than at the edge of the display module 10. For instance, the variable member 20 may have a rounded shape such that a central portion thereof slightly protrudes rearward from the display module 10. Hence, when trying to transform the display module 10 into a curved state, for example, with a constant radius of curvature (designated by reference character R in FIG. 4), variation in the shape of the variable member 20 may facilitate easier transform of the display module 10.

In the present embodiment, the variable member 20 comprises of the band-shaped first and second parts 21 and 22, and the drive unit 30 acts to adjust a distance between the first part 21 and the second part 22 so as to vary the shape of the variable member 20. As such, the variable member 20 may have a simplified configuration and variation in the shape of the variable member 20 may be effectively controlled by the drive unit 30. This will be described in greater detail later.

Ends of the first and second parts 21 and 22 may be secured to the drive unit 30, or may be connected to the drive unit 30 so as to come into contact with and to be linked to the drive unit 30. Alternatively, ends of the first and second parts 21 and 22 may be secured to the support member 14. The present embodiment illustrates that outer ends of the first and second parts 21 and 22, which are proximate to the edge of the display module 10, are secured to the support member 14, and inner ends of the first and second parts 21 and 22 (i.e., facing ends of the first part 21 and the second part 22) are connected to the drive unit 30.

More specifically, ends of the first and second parts 21 and 22, which are proximate to the edge of the display module 10, are secured to the support member 14 via fastening members 26. For instance, a PEM nut (not shown) may be located at the support member 14, and the fastening member 26, such as a screw, bolt, and the like, may be fastened to the PEM nut through a fastening hole 26a of the first part 21 or the second part 22, whereby the end of the first part 21 or the second part 22 may be secured to the support member 14. As such, simplified and easy fastening is possible when using the PEM nut, screw, bolt, and the like. However, the present disclosure is not limited thereto and various other configurations and methods may be employed to secure the ends of the first and second parts 21 and 22 to the support member 14.

A connection configuration of the inner ends of the first and second parts 21 and 22 and the drive unit 30 may be changed according to a configuration of the drive unit 30. Thus, a connection configuration of the inner ends of the first and second parts 21 and 22 and the drive unit 30 will be described later in detail after explanation of the drive unit 30.

The first and second parts 21 and 22 may be movably supported by guide members 28 that are secured to the support member 14. This may prevent deformation of the first and second parts 21 and 22, such as sagging, for example, and allow the first and second parts 21 and 22 to be movable relative to the support member 14.

Each of the guide members 28 comprises of an upper portion 28a, which is spaced apart from the support member 14 with a predetermined space therebetween, and a pair of lateral portions 28b downwardly bent from the upper portion 28a so as to come into contact with the support member 14. The lateral portions 28b are secured to the support member 14 via fastening members 28c. For instance, PEM nuts (not shown) may be located at the support member 14, and the fastening members 28c, such as screws, and the like, may be fastened to the PEM nuts through fastening holes of the lateral portions 28b to secure the guide member 28 to the support member 14. As such, simplified and easy fastening is possible when using the PEM nuts and screws. However, the present disclosure is not limited thereto and various other configurations and methods may be employed to secure the guide member 28 to the support member 14.

As described above, a distance between the variable member 20 and the display module 10 increases going toward the center. Therefore, a height of the upper portion 28a of the guide member 28 may increase going toward the center. This configuration ensures that the first and second parts 21 and 22 are freely movable leftward or rightward while being effectively supported by the guide members 28.

The drawings illustrate that two guide members 28 are allotted to each of the first and second parts 21 and 22. However, the present disclosure is not limited thereto and a single guide member 28 or three or more guide members 28 may be provided at each of the first and second parts 21 and 22. In this case, providing each of the first and second parts 21 and 22 with a plurality of guide members 28 may effectively prevent, for example, sagging of the first and second parts 21 and 22.

In the present embodiment, the shape of the entire variable member 20 may be varied in response to variation in the distance between the first part 21 and the second part 22.

For instance, if a distance between the first part 21 and the second part 22 increases, a length of the entire variable member 20 (i.e. the sum of a length of the first part 21, a length of the second part 22, and the distance between the first part 21 and the second part 22) increases, which causes reduction in the radius of curvature of the variable member 20. Thereby, as both ends of the display module 10, to which both ends of the variable member 20 are secured, are pushed to protrude forward with respect to the central portion, the display panel 12 is transformed into a curved state. In this way, the entire display module 10 may be bent, for example, by a constant radius of curvature R when viewed in a left-and-right direction (see FIG. 4(b)). When the shape of the display module 10 is varied as described above, a distance between the user's eyes and the display panel 12 is substantially equal or insubstantially different between the center and the edge of the display module 10. Thus, this may result in enhanced immersiveness.

On the other hand, if a distance between the first part 21 and the second part 22 is reduced, a length of the entire variable member 20 is reduced, which causes increase in the radius of curvature of the variable member 20. Thereby, the display panel 12 returns to a planar shape. Accordingly, the display module 10 may remain in a planar state when immersiveness is not required (for example, when watching the news).

However, the present disclosure is not limited thereto and the variable member 20 may be varied differently in shape to cause the display panel 12 to be transformed in different ways.

The drive unit 30, which acts to vary the distance between the first part 21 and the second part 22, includes a rotation drive member 31 to supply rotational energy, a lead screw member 35 having screw-threads 351 and 352 to change rotational energy into linear movement energy, and a moving member 37 configured to linearly move on the lead screw member 35. In the present embodiment, the drive unit 30 may further include a gear member 33 to change a rotating axis of rotational energy of the rotation drive member 31.

The rotation drive member 31 to supply rotational energy may be a drive member fabricated in various configurations and via various methods. For instance, the rotation drive member 31 may include a motor 311, and may further include a speed reducer 313 that reduces a rate of rotation of the motor 311 to supply increased rotational energy. Provision of the speed reducer 313 may allow significant reduction in the size of the motor 311. In this case, a speed reduction ratio of the speed reducer 313 may be within a range of 1:2 to 1:300. This range is determined to provide mechanical energy required to vary the shape of the variable member 20 while minimizing the size of the motor 311. However, the speed reduction ratio of the speed reducer 313 may be changed according to the kind of the motor 311, the configuration of the drive unit 30, and the like. In an alternative embodiment, the speed reduction ratio of the speed reducer 313 may be 1:1.

The gear member 33 changes the direction of a rotating axis of the rotation drive member 31. For instance, a rotating axis of the rotation drive member 31 is parallel to the display module 10 and intersects with a longitudinal direction of the variable member 20. The gear member 33 changes the direction of the rotating axis of the rotation drive member 31 to a direction parallel to a longitudinal direction of the variable member 20. In the present embodiment, the gear member 33 may have a bevel gear configuration. That is, the gear member 33 may include conical first and second gear members 331 and 333 to change the direction of the rotating axis of the rotation drive member 31. In this case, the gear member 33 may be any one selected from among a linear bevel gear, a curvilinear bevel gear, a Zerol bevel gear, and the like. When using the gear member 33 in the form of a bevel gear, the gear member 33 may be easily driven even by low power and exhibit high durability. In addition, a thickness of the display apparatus 100 may be minimized owing to the minimized volume of the gear member 33.

The lead screw member 35 may be secured to the gear member 33 and be located in a direction parallel to a longitudinal direction of the variable member 20. The lead screw member 35 includes the screw-threads 351 and 352 of a left-hand screw type and/or right-hand screw type. In the present embodiment, the first screw-threads 351 are formed at a first portion of the lead screw member 35 proximate to the first part 21, and the second screw-threads 352 are formed at a second portion of the lead screw member 35 proximate to the second part 22. The first screw-threads 351 and the second screw-threads 352 may have opposite screwing directions. That is, if the first screw-threads 351 are of a right-hand screw type, the second screw-threads 352 are of a left-hand screw type. If the first screw-threads 351 are of a left-hand screw type, the second screw-threads 352 are of a right-hand screw type.

The moving member 37 includes a first moving member 371 configured to move on the first screw-threads 351 and connected to the first part 21, and a second moving member 372 configured to move on the second screw-threads 352 and connected to the second part 22.

Each of the first and second moving members 371 and 372 has a nut hole 370a to engage at an inner circumferential surface thereof with the first or second screw-threads 351 or 352. As such, the nut hole 370a of the first moving member 371 is located at the first screw-threads 351 of the lead screw member 35, and the nut hole 370a of the second moving member 372 is located at the second screw-threads 352 of the lead screw member 35. With this configuration, if the lead screw member 35 is rotated, the first and second moving members 371 and 372 engaged with the first and second screw-threads 351 and 352 are linearly moved. As described above, since the first screw-threads 351 and the second screw-threads 352 have opposite screwing directions, the first moving member 371 and the second moving member 372 may move toward or away from each other if the rotation drive member 31 rotates in clockwise or counter-clockwise direction. In addition, each of the first and second moving members 371 and 372 may have guide through-holes 370b at both sides of the nut hole 370a, such that guide members 374 may be inserted into the guide through-holes 370b to ensure stable movement of the first or second moving member 371 or 372.

The first and second moving members 371 and 372 further have grooves 370c, respectively, into which the first and second parts 21 and 22 are respectively fitted. As such, the first part 21 may be coupled to the first moving member 371, and the second part 22 may be coupled to the second moving member 372. In a state in which the first part 21 is fitted into the first moving member 371, the first part 21 and the first moving member 371 are secured to each other via first fastening members 370d. In a state in which the second part 22 is fitted into the second moving member 372, the second part 22 and the second moving member 372 are secured to each other via second fastening members 370d. For instance, the first moving member 371 and the first part 21 are secured to each other with the first fastening members 370d, such as screws, bolts, and the like, fastened through fastening holes 370e formed in the first moving member 371 and the first part 21. In addition, the second moving member 372 and the second part 22 are secured to each other with the second fastening members 370d, such as screws, bolts, and the like, fastened through fastening holes 370e formed in the second moving member 372 and the second part 22. Through use of the first or second fastening members 370d, such as bolts, screws, and the like, the first and second moving members 371 and 372 may be firmly secured to the first and second parts 21 and 22 in a simplified configuration.

The first moving member 371 is provided at one side thereof with a first bracket 371a and at the other side thereof with a second bracket 371b. Specifically, the first bracket 371a is located at one portion of the lead screw member 35 (e.g., at the body of the lead screw member 35), and the second bracket 371b is located at another portion of the lead screw member 35 (e.g., at one end of the lead screw member 35). Similarly, the second moving member 372 is provided at one side thereof with a first bracket 372a and at the other side thereof with a second bracket 372b. Specifically, the first bracket 372a is located at one portion of the lead screw member 35 (e.g., at the body of the lead screw member 35), and the second bracket 372b is located at another portion of the lead screw member 35 (e.g., at the other end of the lead screw member 35).

In this case, the first brackets 371a and 372a serve not only as bearing members to prevent eccentric rotation of the rotation drive member 31, but also as coupling members to connect the lead screw member 35 and the rotation drive shaft 31 to each other. Each of the first brackets 371a and 372a may have a nut hole 3710a, through which the lead screw member 35 passes, and guide through-holes 3170b through which the guide members 374 are inserted. Each of the second brackets 371b and 372b may have a screw fixing hole 3710a, through which the lead screw member 35 is inserted, and guide through-holes 3170b through which the guide members 374 are inserted. The first brackets 371a and 372a and the second brackets 371b and 372b may be secured to the support member 14 via various configurations and methods. For instance, PEM nuts may be located at the support member 14, and fastening members 3710d may be fastened through the PEM nuts and fastening holes 3710e of the first brackets 371a and 372a and the second brackets 371b and 372b.

FIG. 2 illustrates that one variable member 20 is located at an upper region of the display module 10 and another variable member 20 is located at a lower region of the display module 10. Alternatively, a single variable member 20 may be located at a center region of the display module 10. Provision of a plurality of variable members 20 may ensure uniform variation in the shape of the entire display module 10. However, the present disclosure is not limited thereto and only one variable member 20 may be used in terms of cost saving and configuration simplification. Alternatively, three or more variable members 20 may be provided in consideration of use of a large-area display module. That is, various other alterations are possible.

The rear cover 40 is located at the rear side of the display module 10 and the variable member 20. The rear cover 40 serves not only to provide a space that will be occupied by some components, such as, for example, the panel drive unit, but also to protect the display module 10 as well as the panel drive unit from external shock. In addition, the rear cover 40 is configured to cover the panel drive unit, and the like, thereby preventing internal components from being visible from the outside, and consequently enhancing the aesthetics of the display module 10. For instance, the rear cover 40 generally has a curvilinear profile, which may provide a sufficient inner space as well as improved external appearance.

In the present embodiment, the rear cover 40 is configured to conform to variation in the shape of the display module 10 when the shape of the display module 10 is varied. Thus, the rear cover 40 may protect the display module 10 and assist the display module 10 in maintaining the external appearance thereof even after the shape of the display module 10 is varied, rather than hindering variation in the shape of the display module 10.

Variation in the shape of the display apparatus 100 as described above will now be described in greater detail with reference to FIGS. 4(a)-4(b). FIGS. 4(a)-4(b) are sectional views taken along line IV-IV of FIG. 2, for explanation of variation in the shape of the display apparatus 100.

Referring to FIG. 4(a), in a planar state, the first and second moving members 371 and 372 are located proximate to the first brackets 371a and 372a, respectively. Thus, the first part 21 and the second part 22 are spaced apart from each other by a relatively small first distance L1.

If the user inputs an instruction for transform into a curved state, the rotation drive member 31 is rotated in a first rotating direction. As the gear member 33 changes a rotating axis of the rotation drive member 31 into a direction parallel to a longitudinal direction of the variable member 20, the lead screw member 35 is rotated in a first direction. Thereby, the first moving member 371 and the second moving member 372 move away from each other, and the first part 21 secured to the first moving member 371 and the second part 22 secured to the second moving member 372 also move away from each other. In this case, once the first and second moving members 371 and 372 have reached the second brackets 371b and 372b, the first and second moving members 371 and 372 are fixed at corresponding positions. In this way, the first part 21 and the second part 22 are fixed with a relatively large second distance L2 therebetween when compared with the first distance L1. Consequently, as exemplarily shown in FIG. 4(b), a length of the entire variable member 20, i.e., the sum of a length of the first part 21, a length of the second part 22, and the second distance L2, is increased, thus causing the variable member 20 to be bent by a constant radius of curvature. In this way, the display panel 12 is transformed into a curved state with a constant radius of curvature R.

If the user inputs an instruction for transform into a planar state, the rotation drive member 31 is rotated in a second rotating direction opposite to the first rotating direction, and consequently the lead screw member 35 is rotated in a second direction opposite to the first direction. Thereby, the first moving member 371 and the second moving member 372 move toward each other, and the first part 21 secured to the first moving member 371 and the second part 22 secured to the second moving member 372 also move toward each other. In this case, once the first and second moving members 371 and 372 have reached the first brackets 371a and 372a, the first and second moving members 371 and 372 are fixed at corresponding positions. Correspondingly, the first part 21 and the second part 22 are fixed with the relatively small first distance L1 therebetween when compared with the second distance L2. As a result, a length of the entire variable member 20, i.e., the sum of a length of the first part 21, a length of the second part 22, and the first distance L1, is reduced, thus causing the display panel 12 to return to a planar state.

In the above description, the user may instruct and control variation in the shape of the display panel 12 in a variety of ways. For instance, the user may input an instruction for variation in the shape by pushing a button of the display apparatus 100, by operating a device to control the display apparatus 100 at a remote distance (e.g., a remote controller), or by taking a certain action (e.g., movement of the user's pupils, or via clapping).

In the present embodiment, the shape of the entire variable member 20 is varied via adjustment of a distance between the first part 21 and the second part 22, rather than direct transform of the first part 21 and the second part 22. This may minimize unwanted permanent deformation of the first and second parts 21 and 22, through repeated movements thereof. In addition, as the first and second parts 21 and 22 are directly connected to the first and second moving members 371 and 372, the variable member 20 may be easily transformed by small force. In addition, in both cases of transform into a curved state and of return to a planar state, the first and second moving members 371 and 372 apply force to the first and second parts 21 and 22 so as to pull the first and second parts 21 and 22. This may ensure stable implementation of return to the planar state.

In this case, a distance between the first part 21 and the second part 22 is varied via change from rotational energy of the drive unit 30 into movement energy of the moving member 37. As such, the distance between the first part 21 and the second part 22 may be varied with a minimized friction area and consequently minimized contact loss. In addition, a transform degree of the variable member 20 may be precisely controlled by controlling rotational energy of the rotation drive member 31 of the drive unit 30.

That is, stable transform may be accomplished with minimized energy required to vary the shape of the display apparatus 100.

Hereinafter, a display apparatus according to other embodiments of the present invention will be described in detail with reference to FIGS. 5 to 12. In the following description, a detailed description related to the same or similar context as or to the above description will be omitted and only differences will be described in detail.

Figure 5:
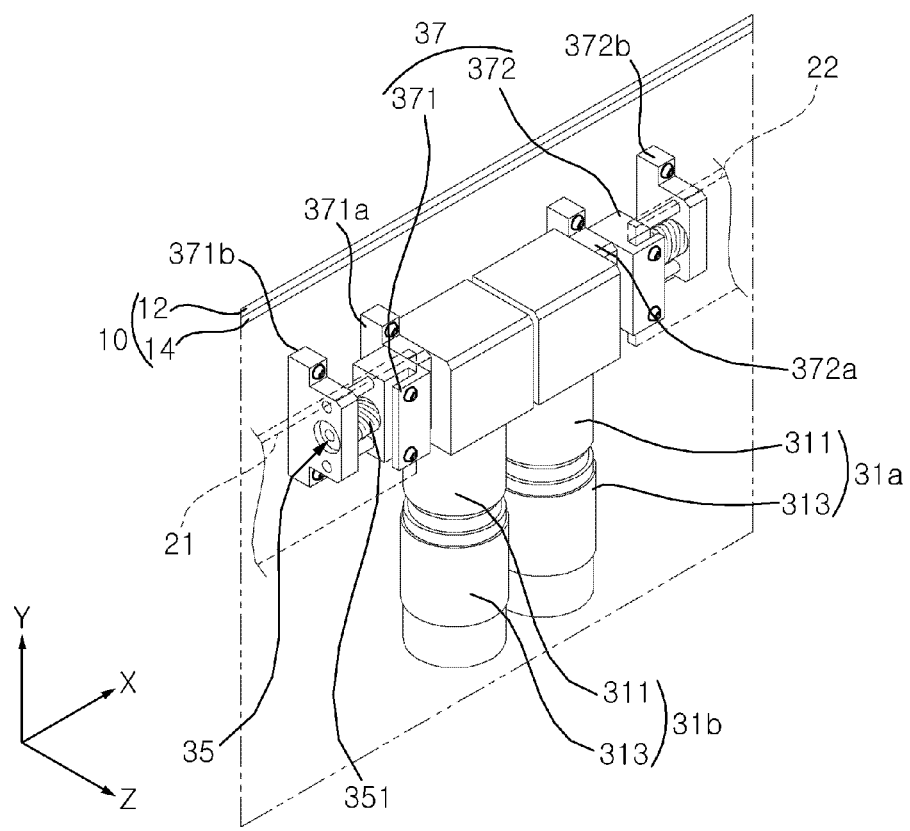
FIG. 5 is a partial perspective view showing a display apparatus according to one alternative embodiment of the present invention.

FIG. 5 is a partial perspective view showing a display apparatus according to one alternative embodiment of the present invention. For reference, FIG. 5 illustrates components corresponding to those shown in FIG. 3.

Referring to FIG. 5, in the present alternative embodiment, a first rotation drive member 31a and a second rotation drive member 31b are provided. As such, in the present alternative embodiment, as the two rotation drive members 31a and 31b respectively provide energy required to transform the variable member 20, each rotation drive member 31a or 31b may have a reduced size (e.g., a reduced diameter). This may aid in reduction in display apparatus thickness. In addition, the first rotation drive member 31a may act to control movement of the first moving member 371, and the second rotation drive member 31b may act to control movement of the second moving member 372. That is, the shape of the variable member 20 and the shape of the display panel 12 may be varied in various ways by individually controlling the first and second moving members 371 and 372. This may provide for partial curvature of display module 10, e.g., only one side of the display module 10 is varied.

Although FIG. 5 illustrates the two rotation drive members 31a and 31b, the present disclosure is not limited thereto. Thus, various alterations, including provision of three or more rotation drive members, for example, are possible.

Figure 6:
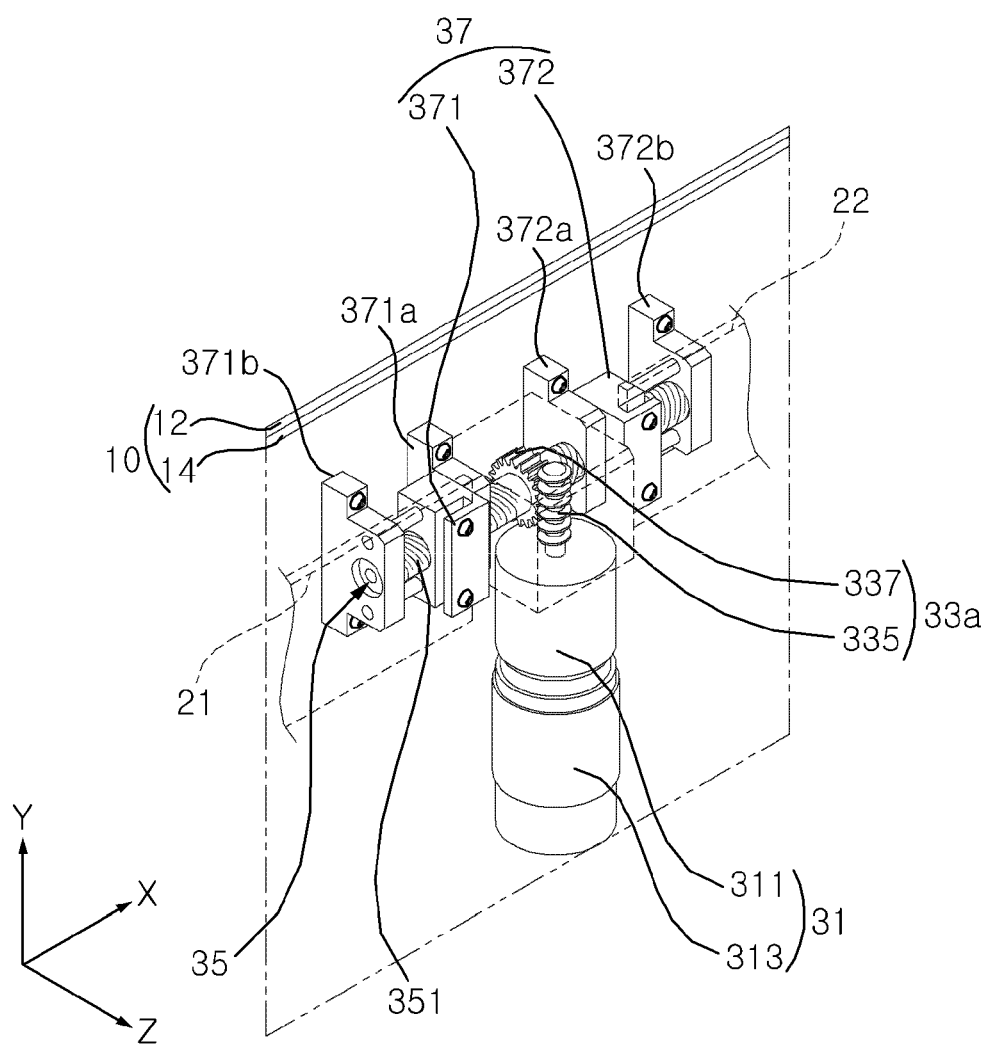
FIG. 6 is a partial perspective view showing a display apparatus according to another alternative embodiment of the present invention.

FIG. 6 is a partial perspective view showing a display apparatus according to another alternative embodiment of the present invention. For reference, FIG. 6 illustrates components corresponding to those shown in FIG. 3.

Referring to FIG. 6, in the present alternative embodiment, a gear member 33a may have a worm gear configuration. Specifically, the gear member 33a may include a worm 335 connected to the rotation drive member 31, and a worm wheel 337 having gear teeth to be engaged with the worm 335 at a right angle. The worm gear type gear member 33a may have a speed reduction ratio. In addition, the worm 335 and the worm wheel 337 are arranged in a single plane and do not deviate to one side. This may prevent unnecessary eccentricity. In this way, the gear member 33a may achieve enhanced stability, and the variable member 20 may be transformed with enhanced stability.

Figure 7:
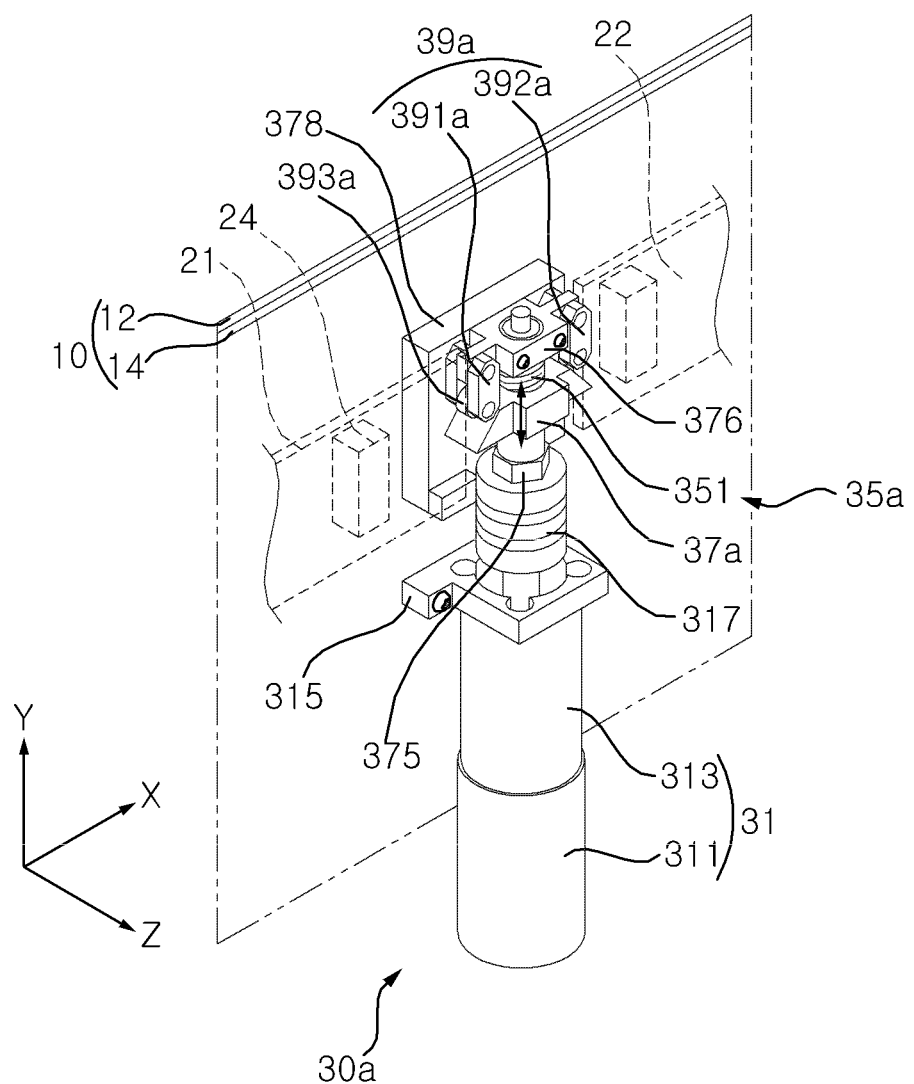
FIG. 7 is a partial perspective view showing a display apparatus according to another embodiment of the present invention.
Figure 8:
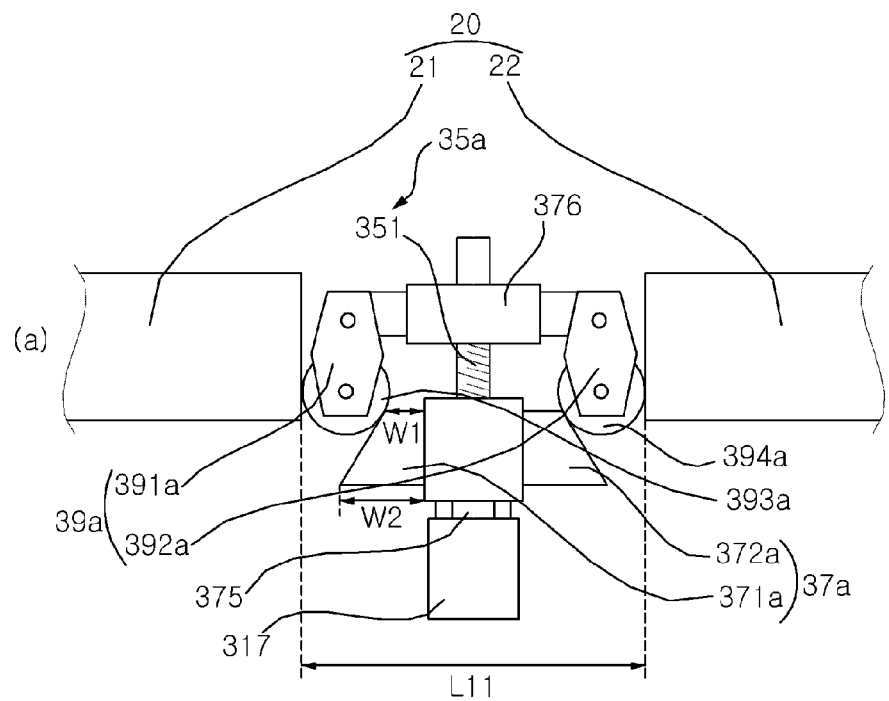
FIGS. 8(a)-8(b) are schematic partial plan views explaining operation of a drive unit of the display apparatus shown in FIG. 7.
Figure 8:
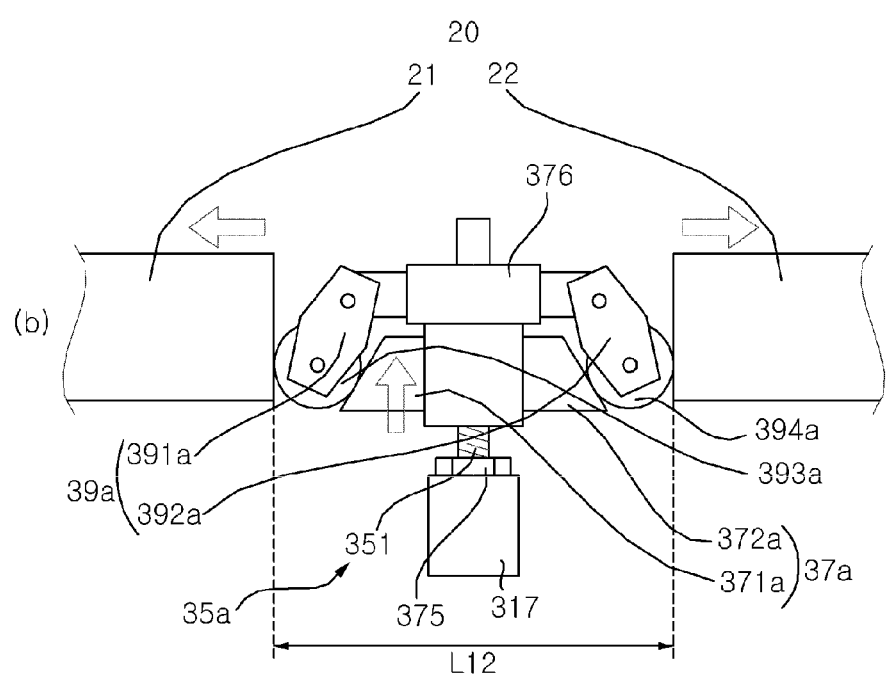

In this case, the rotation drive member 31 may be secured to the support member 14 via a fixing plate 315, for example, as exemplarily shown in FIG. 7. FIG. 6 illustrates that the worm wheel 337 is located proximate to the support member 14 and the worm 335 is located behind the worm wheel 337. However, the present disclosure is not limited thereto. Accordingly, the worm 335 may be located proximate to the support member 14 in order to more stably position the rotation drive member 31, and the worm wheel 337 may be located behind the worm 335. Various other alterations are possible.

FIG. 7 is a partial perspective view showing a display apparatus according to another embodiment of the present invention. FIGS. 8(a)-8(b) are schematic partial plan views explaining operation of a drive unit of the display apparatus shown in FIG. 7. For reference, FIGS. 7 and 8(a)-8(b) illustrate components corresponding to those shown in FIG. 3.

Referring to FIG. 7, a drive unit 30a according to the present embodiment includes the rotation drive member 31 to supply rotational energy, a lead screw member 35a having the screw-threads 351 to change rotational energy into linear movement energy, a moving member 37a to linearly move on the lead screw member 35a, and a shape variation member 39a to be variable in shape via movement of the moving member 37a so as to adjust a distance between the first part 21 and the second part 22.

The rotation drive member 31 may be equal to the rotation drive member 31 of the above-described embodiments, and thus a detailed description thereof will be omitted. In this case, the rotation drive member 31 may be supported by the fixing plate 315 that is secured to the support member 14. This may allow the rotation drive member 31 to be stably fixed. Securing the fixing plate 315 to the support member 14 may be realized via a fastening method using PEM nuts, bolts, screws, and the like, or various other methods.

Both the rotation drive member 31 and the lead screw member 35a are connected to a coupling member 317. More specifically, a rotating shaft of the rotation drive member 31 may be secured to one side of the coupling member 317 and the lead screw member 35a may be secured to the other side of the coupling member 317 such that rotational energy of the rotation drive member 31 is transmitted to the lead screw member 35a. The coupling member 317 may implement connection between the rotating shaft of the rotation drive member 31 and the lead screw member 35a via various configurations and methods. In this way, the lead screw member 35a is arranged in series to the rotating shaft of the rotation drive member 31, and extends in a direction intersecting with a longitudinal direction of the variable member 20 between the first part 21 and the second part 22.

The lead screw member 35a has the screw-threads 351 formed in a given direction (i.e. of a right-hand screw type or left-hand screw type), and the moving member 37a has a through hole to be engaged with the screw-threads 351 of the lead screw member 35a. If the rotation drive member 31 is rotated in a state in which the lead screw member 35a is located in a nut hole of the moving member 37a, the moving member 37a is linearly moved on the lead screw member 35a via rotation of the rotation drive member 31. A movement direction of the moving member 37a is changed according to a rotating direction of the rotation drive member 31.

One end of the lead screw member 35a (e.g., the end proximate to the coupling member 317) is secured by a first bearing member 375, and the other end of the lead screw member 35a (e.g., the end distant from the coupling member 317) is secured by a second bearing member 376. The first and second bearing members 375 and 376 serve to fix the lead screw member 35a at a constant position while supporting load of the lead screw member 35a, and also serve to assist rotation of the lead screw member 35a. The first and second bearing members 375 and 376 may have various well-known configurations.

The present embodiment illustrates that the first and second bearing members 375 and 376 are integrated or secured to a bearing fixing plate 378 and the bearing fixing plate 378 is secured to the support member 14. With this configuration, the bearing fixing plate 378 may act to compensate for a thickness similar to a radius of the rotation drive member 31, which allows the rotating shaft of the rotation drive member 31 to be stably located parallel to the support member 14. In addition, as the bearing fixing plate 378, to which some components, such as the first and second bearing members 375 and 376, and the like, are mounted, is secured to the support member 14, a simplified coupling configuration may be accomplished.

The moving member 37a, which is movably mounted to the lead screw member 35a, is provided at both lateral sides thereof with inducement portions 371a and 372a to induce variation in the shape of the shape variation member 39a. In this case, each of the inducement portions 371a and 372a may have a first width W1 and a second width W2 that are different. More specifically, each of the inducement portions 371a and 372a may have the first width W1 at a portion thereof proximate to the shape variation member 39a and the second width W2 at a portion thereof distant from the shape variation member 39a, the second width W2 being greater than the first width W1. Thus, a width of the inducement portion 371a or 372a may gradually increase with an increasing distance from the second bearing member 376. With this configuration, a length of the shape variation member 39a (more particularly, a distance between a first arm 391a and a second arm 392a) may be varied according to a positional relationship between the inducement portions 371a and 372a and the shape variation member 39a. This will be described in greater detail later after explanation of the shape variation member 39a.

In the present embodiment, the shape variation member 39a may include the first arm 391a rotatably coupled to one side of the second bearing member 376, and the second arm 392a rotatably coupled to the other side of the second bearing member 376. The first arm 391a and the second arm 392a may be symmetrical to one another about the second bearing member 376 or the lead screw member 35a. Although the present embodiment illustrates that one side of each of the first and second arms 391a and 392a is secured to the second bearing member 376, the present disclosure is not limited thereto. Accordingly, the first and second arms 391a and 392a may be rotatably fixed at one side thereof via various configurations and methods.

First and second roller members 393a and 394a may be located respectively at the other side of the first and second arms 391a and 392a and abut and connect to the first and second parts 21 and 22. The first and second roller members 393a and 394a may also abut and connect to the inducement portions 371a and 372a of the moving member 37a. Here, connection may mean that the first and second roller members 393a and 394a rotatably and movably come into contact with the inducement portions 371a and 372a. In addition, various other configurations, in which the first and second roller members 393a and 394a are rotated by the inducement portions 371a and 372a to apply force to the first and second parts 21 and 22, for example, are possible.

In this case, a support bar 24 to support the first and second parts 21 and 22 may be located proximate to the inner ends of the first and second parts 21 and 22 so as to be interposed between the support member 14 and the first and second parts 21 and 22. This serves to prevent the inner ends of the first and second parts 21 and 22 from sagging, in consideration of the fact that the first and second arms 391a and 392a are connected to the first and second parts 21 and 22, rather than being directly secured to the first and second parts 21 and 22.

Variation in the shape of the display panel 12 due to the above-described drive unit 30a will now be described in greater detail.

Referring to FIG. 8(a), in a planar state, the inducement portions 371a and 372a are distant from the second bearing member 376 (i.e., from rotatably fixed ends of the first and second arms 391a and 392a). As such, the other ends of the first and second arms 391a and 392a are located at portions of the inducement portions 371a and 372a having a relatively small first width W1. In such a state, the first part 21 and the second part 22 are spaced apart from each other by a relatively small first distance L11.

If the user inputs an instruction for transform into a curved state, as exemplarily shown in FIG. 8(b), the lead screw member 35a is rotated via rotation of the rotation drive member 31, whereby the moving member 37a is moved toward the second bearing member 376 (i.e., toward the rotatably fixed ends of the first and second arms 391a and 392a). Thus, the other ends of the first and second arms 391a and 392a are located at portions of the inducement portions 371a and 372a having a relatively large second width W2 when compared with the first width W1. In such a state, the first and second inducement portions 371a and 372a push the first and second arms 391a and 392a, thus causing the first part 21 and the second part 22 to be spaced apart from each other by a relatively large second distance L1 when compared with the first distance L11. Through the increased distance between the first part 21 and the second part 22, a length of the variable member 20 is increased, and consequently the display panel 12 is transformed into a curved state.

In this case, the first and second roller members 393a and 394a allow the first and second arms 391a and 392a to move on lateral surfaces of the inducement portions 371a and 372a with minimum friction and to push the first and second parts 21 and 22 with minimum friction.

If the user inputs an instruction for transform into a planar state, as exemplarily shown in FIG. 8(a), the lead screw member 35a is rotated in an opposite direction via rotation of the rotation drive member 31, whereby the moving member 37a is moved away from the second bearing member 376 (i.e., away from the rotatably fixed ends of the first and second arms 391a and 392a). In this way, the first part 21 and the second part 22 are spaced apart from each other by the relatively small first distance L11, thus causing the display panel 12 to return to a planar state.

In this case, the first and second roller members 393a and 394a allow the first and second arms 391a and 392a to move on lateral surfaces of the inducement portions 371a and 372a with minimum friction. In addition, the first and second parts 21 and 22 may be provided at the inner ends thereof (i.e., facing ends thereof) with reinforcement members (not shown). The reinforcement members serve to increase strength of the inner ends of the first and second parts 21 and 22 and to facilitate movement of the first and second roller members 393a and 394a. For instance, the reinforcement members may be formed of a metal (e.g., aluminum).

In the present embodiment, the rotating shaft of the rotation drive member 31 is used without requiring a separate gear member. In addition, the lead screw member 35a includes the screw-threads 351 provided only at one end portion thereof. With this configuration, the drive unit 30a may have a simplified configuration. That is, according to the present embodiment, the shape of the variable member 20 may be easily varied by means of a simple configuration.

FIGS. 9(a)-9(b) are schematic partial plan views showing a part of a display apparatus according to another alternative embodiment of the present invention. In the following description, a detailed description of the same or similar components as or to those shown in FIG. 7 will be omitted.

Referring to FIGS. 9(a)-9(b), a drive unit 30b according to the present alternative embodiment includes a rotation drive member to supply rotational force (31 in FIGS. 1 and 7), a lead screw member 35b having the screw-threads 351 and 352 to change rotational energy into linear movement energy, a moving member 37b to linearly move on the lead screw member 35b, and a shape variation member 39b to be variable in shape via movement of the moving member 37b so as to adjust a distance between the first part 21 and the second part 22.

The first screw-threads 351 are formed at one end portion of the lead screw member 35b, and the second screw-threads 352 are formed at the other end portion of the lead screw member 35b. The first screw-threads 351 and the second screw-threads 352 may have opposite screwing directions.

The moving member 37b includes a first moving member 371b located at one side of the lead screw member 35b and a second moving member 372b located at the other side of the lead screw member 35b. The first and second moving members 371b and 372b have nut holes to be engaged respectively with the first and second screw-threads 351 and 352. As such, the first and second moving members 371b and 372b are movably located on the first and second screw-threads 351 and 352. As described above, since the first and second screw-threads 351 and 352 have different screwing directions, the first and second moving members 371b and 372b may move toward or away from each other based on the rotational direction of the rotation drive member 31.

The shape variation member 39b includes a first arm 391b to connect the first part 21 and the first and second moving members 371b and 372b to each other, and a second arm 392b to connect the second part 22 and the first and second moving members 371b and 372b to each other. More specifically, the first arm 391b may include a first arm portion 3911b to connect the first part 21 and the first moving member 371b to each other, and a second arm portion 3912b to connect the first part 21 and the second moving member 372b to each other. The first and second arm portions 3911b and 3912b of the first arm 391b may have a link configuration such that an angle between the first and second arm portions 3911b and 3912b may be easily varied. Likewise, the second arm 392b may include a first arm portion 3921b to connect the second part 22 and the first moving member 371b to each other, and a second arm portion 3922b to connect the second part 22 and the second moving member 372b to each other. The first and second arm portions 3921b and 3922b of the second arm 392b may have a link configuration such that an angle between the first and second arm portions 3921b and 3922b may be easily varied.

In this case, the first arm portions 3911b and 3912b and the second arm portions 3921b and 3922b are rotatably fixed respectively to the first and second parts 21 and 22 via fixing members 341. In this way, movement of the first and second parts 21 and 22 may be restricted by movement of the first arm portions 3911b and 3912b and the second arm portions 3921b and 3922b.

Operation of the drive unit 30b will now be described in detail.

Referring to FIG. 9(a), in a planar state, the first and second moving members 371b and 372b are distant from each other. Each of the first arm 391b and the second arm 392b may have a relatively large center angle. In such a state, the first part 21 and the second part 22 may be spaced apart from each other by a relatively small first distance L21.

If the user inputs an instruction for transform into a curved state, as exemplarily shown in FIG. 9(b), the lead screw member 35b is rotated in a given direction via rotation of the rotation drive member 31, thereby causing the first and second moving members 371b and 372b to move toward each other. As a result, a center angle of each of the first arm 391b and the second arm 392b is reduced. Thus, the first and second parts 21 and 22 connected to the first and second arms 391b and 392b are spaced apart from each other by a relatively large second distance L22 when compared with the first distance L21. In this way, as a length of the variable member 20 is increased, the shape of the display panel 12 is transformed into a curved state.

If the user inputs an instruction for transform into a planar state, as exemplarily shown in FIG. 9(a), the lead screw member 35a is rotated in an opposite direction via rotation of the rotation drive member 31, thereby causing the first and second moving members 371b and 372b to be moved away from each other. As a result, a center angle of each of the first arm 391b and the second arm 392b is increased, and the first and second parts 21 and 22 connected to the first and second arms 391b and 392b are spaced apart from each other by a relatively small first distance L21 when compared with the second distance L22. In this way, the display panel 12 returns to a planar shape.

According to the present alternative embodiment, the shape of the variable member 20 may be easily varied with a simplified configuration that does not use the gear member, and the like. In addition, since each of the first and second arms 391b and 392b is secured to the first or second part 21 or 22 via the fixing members 341, the first and second parts 21 and 22 are moved together with each other when the first and second arms 391b and 392b are moved. Accordingly, when the first and second arms 391b and 392b push or pull the first and second parts 21 and 22, stable movement of the first and second parts 21 and 22 may be accomplished. In addition, even if a distance between the first and second parts 21 and 22 is varied by the fixing members 341, portions of the first and second parts 21 and 22 to which force is transmitted may remain in place. This may prevent occurrence of unnecessary eccentricity, resulting in enhanced stability upon transform.

Figure 9:
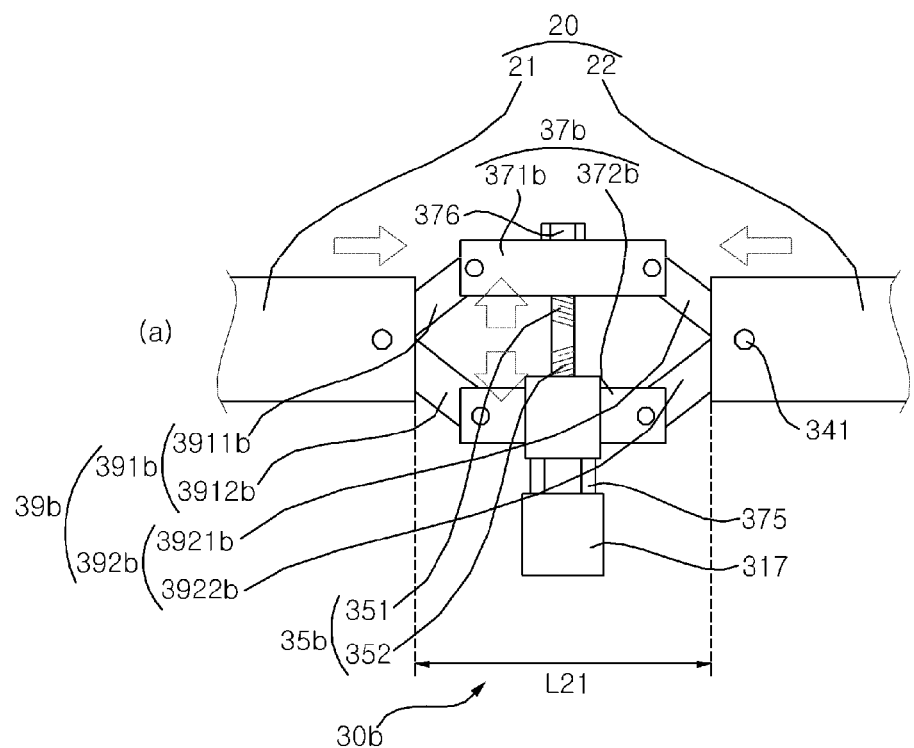
FIGS. 9(a)-9(b) are schematic partial plan views showing a part of a display apparatus according to another alternative embodiment of the present invention.
Figure 9:
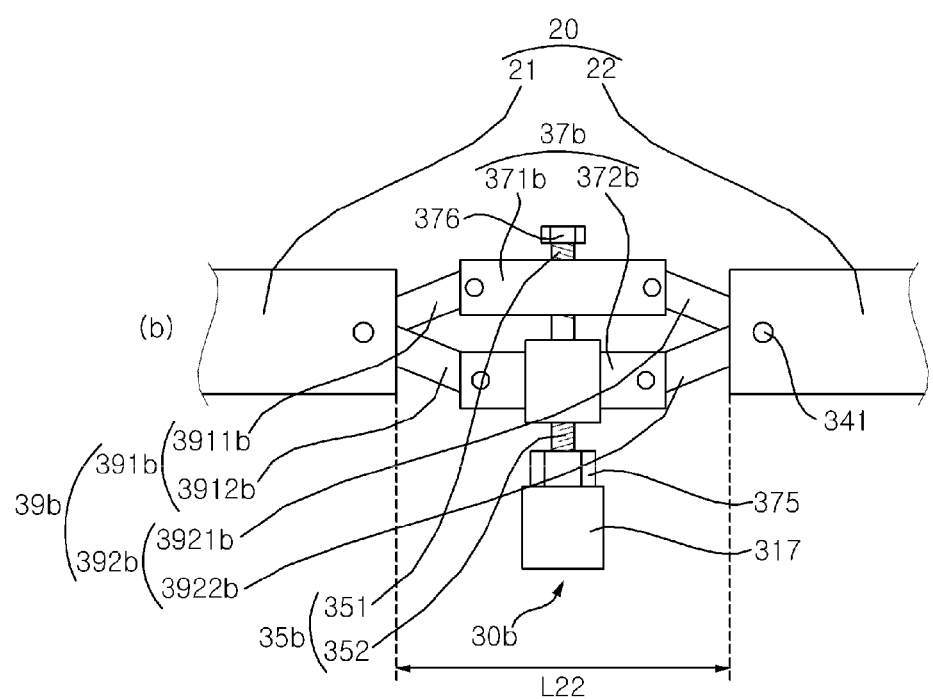
Figure 10:
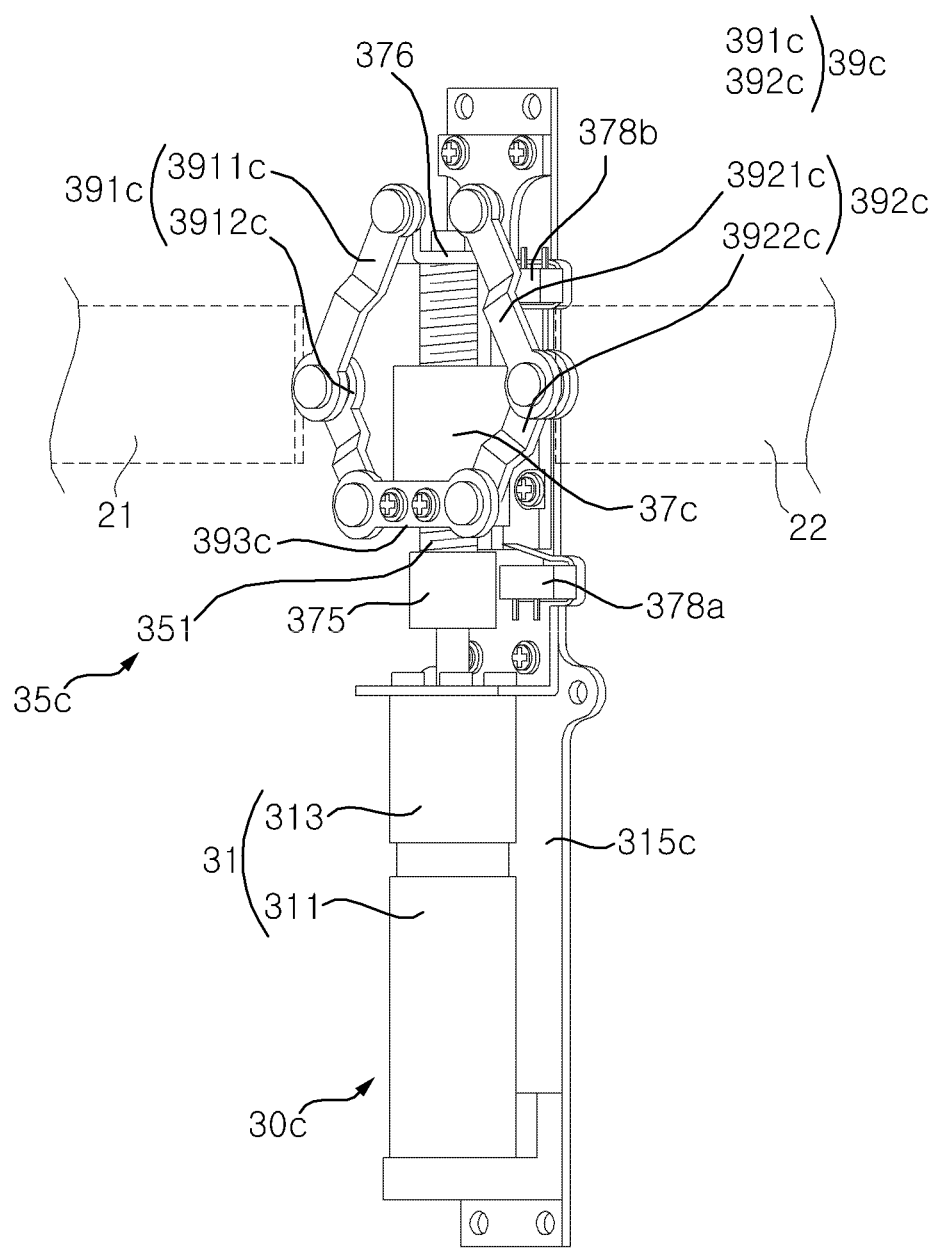
FIG. 10 is a schematic view showing a part of a display apparatus according to a further alternative embodiment of the present invention.
Figure 11:
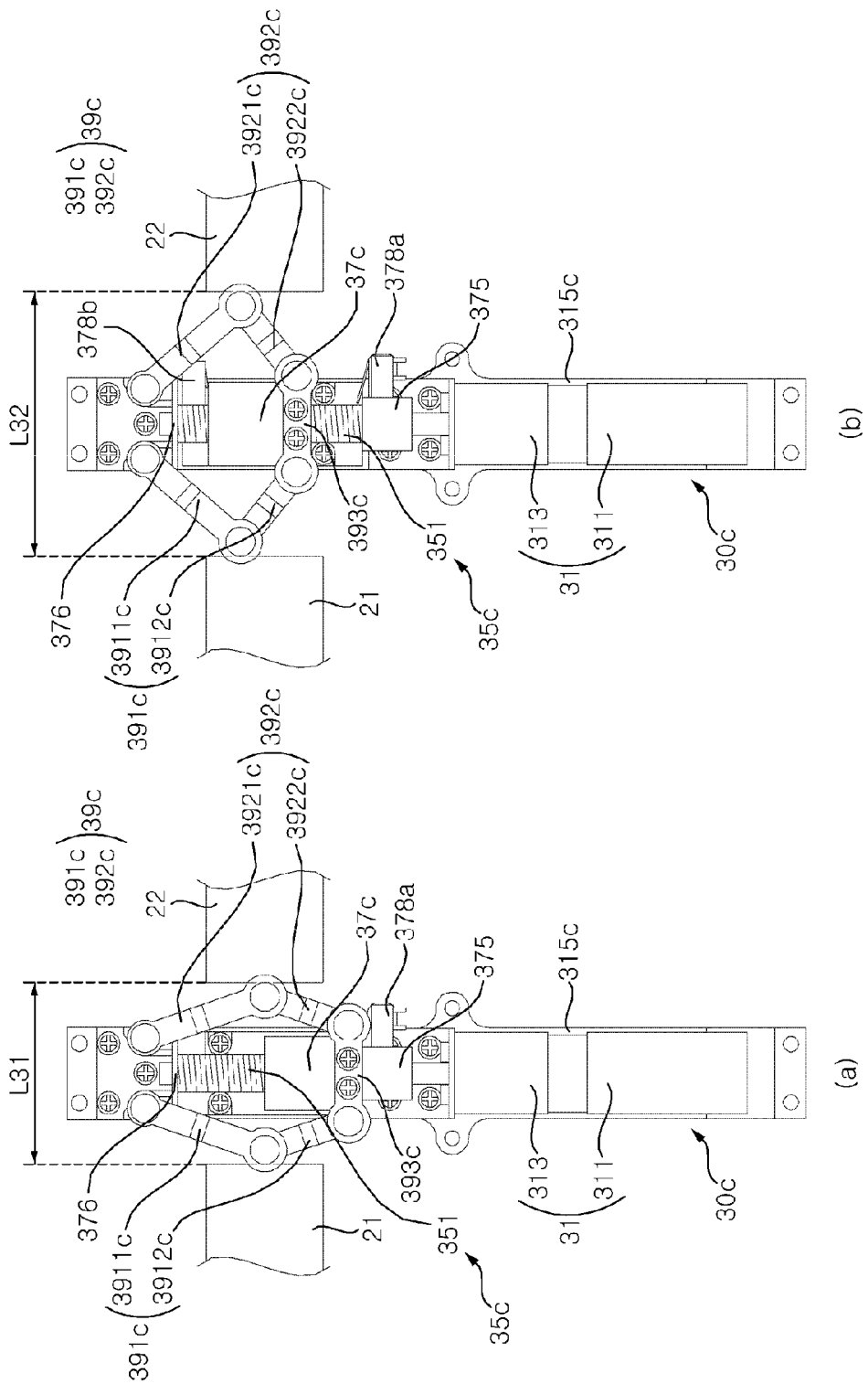
FIGS. 11(a)-11(b) are schematic partial plan views explaining operation of a drive unit of the display apparatus shown in FIG. 10.

FIG. 10 is a schematic view showing a part of a display apparatus according to a further alternative embodiment of the present invention, and FIGS. 11(a)-11(b) are schematic partial plan views explaining operation of a drive unit of the display apparatus shown in FIG. 10. For reference, FIGS. 9(a)-9(b) and 10 illustrate components corresponding to those shown in FIG. 3. A detailed description of the same or similar components as or to the above description with reference to FIGS. 7 to 9 will be omitted.

Referring to FIG. 10, a drive unit 30c according to the present alternative embodiment includes the rotation drive member 31 to supply rotational energy, a lead screw member 35c having the screw-threads 351 to change rotational energy into linear movement energy, a moving member 37c to linearly move on the lead screw member 35c, and a shape variation member 39c to be variable in shape via movement of the moving member 37c so as to adjust a distance between the first part 21 and the second part 22.

In this case, the lead screw member 35c has the screw-threads 351 formed in a given direction (i.e., of a right-hand screw type or left-hand screw type), and the moving member 37c has a nut hole to be engaged with the screw-threads 351 of the lead screw member 35c. If the rotation drive member 31 is rotated in a state in which the lead screw member 35c is located in the nut hole of the moving member 37c, the moving member 37c is linearly moved on the lead screw member 35c via rotation of the rotation drive member 31. A movement direction of the moving member 37c is changed according to a rotating direction of the rotation drive member 31.

In the present alternative embodiment, the shape variation member 39c may include a first arm 391c and a second arm 392c symmetrical to the first arm 391c, each of the first arm 391c and the second arm 392c having a variable center angle. More specifically, the first arm 391c may include a first arm portion 3911c and a second arm portion 3912c to connect the first part 21 and the moving member 37c to each other. The first and second arm portions 3911c and 3912c of the first arm 391c may have a link configuration such that an angle between the first and second arm portions 3911c and 3912c is easily variable. Likewise, the second arm 392c may include a first arm portion 3921c and a second arm portion 3922c to connect the second part 22 and the moving member 37c to each other. The first and second arm portions 3921c and 3922c of the second arm 392c have a link configuration such that an angle between the first and second arm portions 3921c and 3922c is easily variable.

In this case, the first part 21 may be fixedly fitted between the first and second arm portions 3911c and 3912c of the first arm 391c, and the second part 22 may be fixedly fitted between the first and second arm portions 3921c and 3922c of the second arm 392c. Accordingly, stable connection between the first and second arms 391c and 392c and the first and second parts 21 and 22 may be accomplished with a simplified configuration.

One end of each of the first and second arms 391c and 392c is immovably fixed, and the other end of each of the first and second arms 391c and 392c is fixed to the moving member 37c. For instance, in the present alternative embodiment, one end of each of the first and second arms 391c and 392c proximate to the second bearing member 376 is immovably fixed to the second bearing member 376. The other end of each of the first and second arms 391c and 392c is rotatably fixed to a link 393c that is mounted to the moving member 37c. With this configuration, as the moving member 37c is moved on the lead screw member 35c, a center angle of each of the first and second arms 391c and 392c is varied, which causes variation in a distance between the first and second parts 21 and 22.

A first position sensor 378a is located near the first bearing member 375, and a second position sensor 378b is located near the second bearing member 376. If the first and second arms 391c and 392c respectively reach the first and second position sensors 378a and 378b, movement of the first and second arms 391c and 392c stop. This may ensure accurate position control of the first and second arms 391c and 392c. Various shapes and types of sensors may be utilized as the first and second position sensors 378a and 378b.

Operation of the above-described drive unit 30c will now be described in detail.

Referring to FIG. 11(a), in a planar state, the moving member 37c is distant from the second bearing member 376. In such a state, the first arm 391c may have a relatively large center angle, and the second arm 392c may have a relatively large center angle. Hence, the first part 21 and the second part 22 may be spaced apart from each other by a relatively small first distance L31.

If the user inputs an instruction for transform into a curved state, as exemplarily shown in FIG. 11(b), the lead screw member 35c is rotated in a given direction via rotation of the rotation drive member 31, thereby causing the moving member 37c to be moved toward the second bearing member 376. As a result, a center angle of the first arm 391c is reduced and a center angle of the second arm 392c is reduced. Thus, the first and second parts 21 and 22 connected to the first and second arms 391c and 392c are spaced apart from each other by a relatively large second distance L32 when compared with the first distance L31. In this way, as a length of the variable member 20 is increased, the shape of the display panel 12 is transformed into a curved state.

If the user inputs an instruction for transform into a planar state, as exemplarily shown in FIG. 11(a), the lead screw member 35c is rotated in an opposite direction via rotation of the rotation drive member 31, thereby causing the moving member 37c to be moved away from the second bearing member 376. As a result, a center angle of the first arm 391c is increased and a center angle of the second arm 392c is increased. Thus, the first and second parts 21 and 22 connected to the first and second arms 391c and 392c are spaced apart from each other by the relatively small first distance L31 when compared with the second distance L32. In this way, the display panel 12 returns to a planar state.

According to the present alternative embodiment, the shape of the variable member 20 may be easily varied with a simplified configuration not using the gear member.

Figure 12:
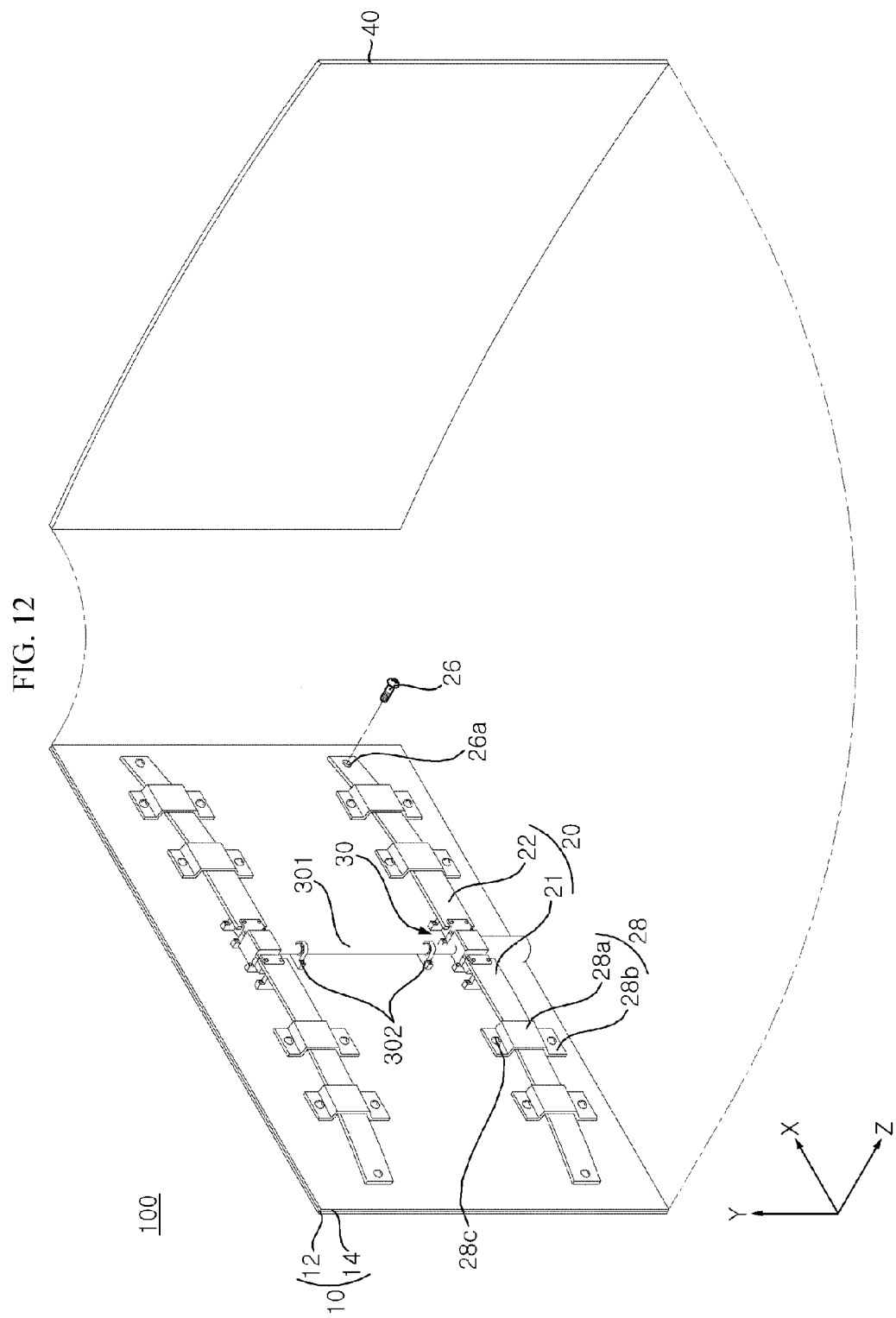
FIG. 12 is a rear perspective view showing a display apparatus according to a further embodiment of the present invention.

FIG. 12 is a rear perspective view showing a display apparatus according to a further embodiment of the present invention.

Referring to FIG. 12, in the present embodiment, a plurality of variable members 20 may be transformed by a single drive unit 30. That is, a rotating shaft 301 of the single drive unit 30 may extend to reach the plurality of variable members 20 such that the plurality of variable members 20 may be transformed together by the single drive unit 30. In this case, to stably fix the drive unit 30 so as to supply rotational energy of the drive unit 30 to the plurality of variable members 20, the rotating shaft 301 of the drive unit 30 may be secured to the support member 14 via a third bearing member 302, for example.

In this way, through use of only one drive unit 30, the number of components constituting the display apparatus 100 may be reduced, which results in reduced manufacture costs and reduced unit price.

Although the preferred embodiments of the present invention have been disclosed for illustrative purposes, those skilled in the art will appreciate that various modifications, additions and substitutions are possible, without departing from the scope and spirit of the invention.

What is claimed is:

1. A display apparatus comprising:
a display module including a flexible display panel and a support member supporting the display panel;
a variable member to vary a shape of the display panel, the variable member including at least a first part and a second part that are discontinuous;
a drive unit to provide energy required to vary a separation distance between the first part and the second part so that the shape of the display panel is varied, the drive unit including a first moving member configured to linearly move in a left-and-right direction and a second moving member configured to linearly move in the left-and-right direction,
wherein the first part is coupled to the first moving member and the second part is coupled to the second moving member;
guide members (374) to guide movement of the first moving member and the second moving member; and
guide members (28) movably supporting the first part and the second part by contacting a rear surface of the first and the second parts, the guide members (28) secured to the support member,
wherein inner ends which face each other, of the first and second parts are connected to the moving member;
outer ends which are the opposite ends of the respective inner ends of the first and second parts are secured to the display module:
each of the guide members (28) comprises of an upper portion spaced apart from the support member and contacting the rear surface;

the distance between the variable member and the display module increases going towards the center of the display module; and a height of a space between upper portions of the guide members and the support member increases going towards the center.

2. The display apparatus according to claim 1, wherein the drive unit is located between the first part and the second part to vary the separation distance between the first part and the second part using mechanical energy.

3. The display apparatus according to claim 2, wherein the drive unit includes:

a rotation drive member to supply rotational energy; and a lead screw member having screw-threads to change the rotational energy into linear movement energy;

wherein the moving member moves on the lead screw member, thereby varying the separation distance between the first part and the second part.

4. The display apparatus according to claim 3, wherein a rotating axis of the rotation drive member intersects with a longitudinal direction of the variable member.

5. The display apparatus according to claim 3, further comprising a gear member to change the direction of a rotating axis of the rotational energy of the rotation drive member to a longitudinal direction of the variable member.

6. The display apparatus according to claim 5, wherein the gear member includes a bevel gear or a worm gear.

7. The display apparatus according to claim 1, wherein the first moving member is located at a first portion of the lead screw member and the second moving member is located at a second portion of the lead screw member.

8. The display apparatus according to claim 3, wherein a rotating axis of the rotation drive member intersects with a longitudinal direction of the variable member, wherein the display apparatus further includes a gear member to change the direction of a rotating axis of the rotation drive member, and wherein the lead screw member is located in a direction parallel to a longitudinal direction of the variable member and the gear member interacting with the lead screw member.

9. The display apparatus according to claim 3, wherein screw-threads formed at a first portion of the lead screw member and screw-threads formed at a second portion of the lead screw member opposite to the first portion have opposite screwing directions.

10. The display apparatus according to claim 3, further comprising a first bracket located at one side of the moving member and a second bracket located at the other side of the moving member, wherein the moving member moves between the first bracket and the second bracket.

11. The display apparatus according to claim 3, wherein one or more drive members are provided.

12. The display apparatus according to claim 1, wherein the support member is located at a rear surface of the display panel and the variable member is located at the rear surface of the support member.

13. The display apparatus according to claim 1, wherein each of the guide members (28) comprises of an upper portion spaced apart from the support member, and a lateral portion downwardly bent from the upper portion and secured to the support member.

14. The display apparatus according to claim 1, wherein increasing the separation distance between the first part and the second part causes bending of the first part and the second part such that a central portion of the first part and a central portion of the second part protrude rearward from the display module.

15. The display apparatus according to claim 1, wherein each of the guide members (28) comprises of an upper portion spaced apart from the support member, and a pair of lateral portion secured to the support member.

16. The display apparatus according to claim 1, wherein the first part and the second part are movable leftward or rightward while being supported by the guide members.

17. The display apparatus according to claim 1, wherein a distance between the variable member and the support member increases going toward the center from the edge of the display module.

18. The display apparatus according to claim 1, wherein the guide members (28) prevent a distance between portion of the variable member supported by the guide members (28) and the support member from increasing.

* * * * *